(12) United States Patent
Kochilla et al.

(10) Patent No.: US 7,101,469 B2
(45) Date of Patent: Sep. 5, 2006

(54) METAL PIECES AND ARTICLES HAVING IMPROVED CORROSION RESISTANCE

(75) Inventors: John R. Kochilla, Rock Hill, SC (US); Morgan Bishop, Fort Mill, SC (US); William B. Staples, Monroe, NC (US)

(73) Assignee: Atotech Deutschland GmbH, Berlin (DE)

( * ) Notice: Subject to any disclaimer, the term of this patent is extended or adjusted under 35 U.S.C. 154(b) by 0 days.

(21) Appl. No.: 10/985,452

(22) Filed: Nov. 10, 2004

(65) Prior Publication Data

US 2006/0099439 A1    May 11, 2006

(51) Int. Cl.
*C25D 11/38*    (2006.01)
*C25D 13/00*    (2006.01)
*C25D 13/04*    (2006.01)
*C25D 13/12*    (2006.01)

(52) U.S. Cl. ........................ 205/317; 205/319; 427/436; 427/443.2

(58) Field of Classification Search ............... 428/626, 428/457, 681, 666, 658; 427/435, 436, 443.2; 205/317, 316, 319
See application file for complete search history.

(56) References Cited

U.S. PATENT DOCUMENTS

| | | | | |
|---|---|---|---|---|
| 3,660,172 A * | 5/1972 | Otto | ............ | 148/241 |
| 3,843,430 A | 10/1974 | Kinder | ............ | 156/20 |
| 3,932,198 A | 1/1976 | Schneider | ............ | 148/6.2 |
| 4,162,947 A | 7/1979 | Canaris | ............ | 204/55 |
| 4,165,242 A | 8/1979 | Kelly et al. | ............ | 148/6.15 |
| 4,171,231 A | 10/1979 | Bishop et al. | ............ | 148/6.21 |
| 4,188,271 A | 2/1980 | Eckles et al. | ............ | 204/55 |
| 4,263,059 A | 4/1981 | Guhde et al. | ............ | 148/6.2 |
| 4,349,392 A | 9/1982 | Huvar | ............ | 148/6.2 |
| 4,366,002 A * | 12/1982 | Carandang | ............ | 134/2 |
| 4,705,576 A | 11/1987 | Klos et al. | ............ | 148/6.2 |
| 4,842,958 A | 6/1989 | Higuchi et al. | ............ | 428/629 |
| 4,910,097 A | 3/1990 | Nomura et al. | ............ | 428/623 |
| 5,102,746 A * | 4/1992 | Shindou et al. | ............ | 428/623 |
| 5,147,730 A | 9/1992 | Ogishi et al. | ............ | 428/623 |
| 5,200,057 A | 4/1993 | Canaris | ............ | 205/313 |
| 5,385,655 A | 1/1995 | Brent et al. | ............ | 204/181.1 |
| 5,393,354 A | 2/1995 | Bishop | ............ | 148/258 |
| 5,407,749 A * | 4/1995 | Bishop | ............ | 428/472.1 |
| 5,415,702 A | 5/1995 | Bishop et al. | ............ | 148/258 |
| 5,603,818 A * | 2/1997 | Brent et al. | ............ | 204/488 |
| 2004/0173289 A1 | 9/2004 | Kinoshita et al. | ............ | 148/248 |

FOREIGN PATENT DOCUMENTS

| | | |
|---|---|---|
| DE | 101 62 756 | 7/2003 |
| EP | 337 411 | 10/1989 |
| EP | 1 318 212 | 6/2003 |
| GB | 1 461 244 | 1/1977 |

OTHER PUBLICATIONS

Chrysler Specification: PS 7187, Aug. 2000, 4 pages.
Chrysler Specification: PS 7902, Aug. 2000, 6 pages.
Whyco Finishing Technologies, LLC—Process Detail Electrocoat (Anodic), 1 page, no date.
PCT/US2005/036321; PCT International Search Report mailed Feb. 14, 2006.

* cited by examiner

*Primary Examiner*—Michael E. Lavilla
(74) *Attorney, Agent, or Firm*—Renner, Otto, Boisselle & Sklar, LLP

(57) ABSTRACT

A metal piece having an organic coating with improved corrosion resistance and adhesion is described which comprises a zinc or zinc alloy plated metal piece having on its surface, a chromate film deposited from an aqueous acidic chromium solution comprising trivalent chromium as substantially the only chromium ion present, and a cathodic electrocoated siccative organic coating on the chromate film. A process for obtaining such coated metal pieces also is described.

11 Claims, No Drawings

METAL PIECES AND ARTICLES HAVING IMPROVED CORROSION RESISTANCE

FIELD OF THE INVENTION

This invention relates to metal pieces having an organic coating exhibiting improved adhesion and corrosion resistance. More particularly, the invention relates to a method of improving the corrosion resistance of metals.

BACKGROUND OF THE INVENTION

Considerable attention has been directed to providing improved corrosion protection to metallic surfaces. One method for providing this corrosion protection is by depositing one or various conversion coatings on the metal surfaces to form a coating which protects the metal against corrosion and also serves as a base for improving the adhesion of subsequently applied siccative organic finishes. Such conversion coatings are applied by treatment of the surfaces with solutions of various chemicals which react with the surface to form the desired coating. Among the commonly used conversion coating compositions are aqueous phosphate and chromate solutions.

Another method for providing improved corrosion protection to metallic surfaces involves electrodepositing a zinc or zinc alloy coating on the metal surface.

Solvent-based siccative organic coating compositions have been applied to metal surfaces such as by spraying, dipping, rolling, etc. Water-soluble and/or dispersible resin based paints and lacquers also may be utilized to coat metal surfaces, and these may be applied by electrophoresis. The electrophoretic application of paint and lacquer involves the phenomena of electro-osmosis and electrolysis, as well as electrophoresis. In this method, an electric current is passed through the paint or lacquer solution while the article to be painted is made an electrode in the paint or lacquer.

Although the above techniques have provided corrosion protection to metal surfaces, there continues to be a need for metals and metal surfaces exhibiting even higher corrosion protection and improved adhesion of siccative coatings to the metal.

SUMMARY OF THE INVENTION

A process for improving the corrosion resistance of a metal is described which comprises:
(A) plating the metal with zinc or a zinc alloy to form a zinc or a zinc alloy surface,
(B) applying a chromium coating on the zinc or zinc alloy surface by contacting the zinc or zinc alloy surface with an aqueous acidic chromium solution comprising trivalent chromium as substantially the only chromium ion present, and
(C) depositing a siccative organic coating on the chromium coating using a cathodic electrocoating process.

Metal pieces are also described which have an organic coating with improved adhesion and corrosion resistance, and said metal pieces comprise a zinc or zinc alloy plated steel piece having on its surface, a chromate film deposited from an aqueous acidic chromium solution comprising trivalent chromium as substantially the only chromium ion present, and a cathodic electrocoated siccative organic coating on the chromate film. The metal of the metal pieces utilized in the present invention may comprise aluminum, iron, steel, magnesium, magnesium alloy or galvanized iron.

DESCRIPTION OF THE EMBODIMENTS

In one embodiment, the process of the present invention comprises:
(A) plating a metal with zinc or a zinc alloy to form a zinc or a zinc alloy surface,
(B) applying a chromium coating on the zinc or zinc alloy surface by contacting the zinc or zinc alloy surface with an aqueous acidic chromium solution comprising trivalent chromium as substantially the only chromium ion present, and
(C) depositing a siccative organic coating on the chromium coating using a cathodic electrocoating process.

The method of the present invention is useful for improving the corrosion resistance of a variety of metals. In one embodiment, the metals which can be treated in accordance with the present invention include aluminum, iron, steel, magnesium, magnesium alloy or galvanized iron. The metal pieces which are treated in accordance with the present invention may comprise unformed metal sheets or panels, formed metal panels, small metal parts such as nuts, bolts, and screws, and sub assemblies. In one embodiment, the metal pieces to be treated in accordance with the process of the present invention include automotive steel panels and assemblies.

In the first step of the process of the present invention, a metal is plated with zinc or a zinc alloy. The term "alloy", as used in this specification and claims is defined as a mixture of zinc and one or more metallic elements which may be microscopically homogenous or microscopically heterogeneous. In one embodiment, the zinc alloys may comprise zinc and one or more of iron, nickel, cobalt and manganese. In yet another embodiment, the zinc nickel alloy comprises a zinc-nickel alloy or a zinc-iron alloy. In one embodiment the alloy may comprise zinc-nickel-cobalt, and in another embodiment the alloy is free of cobalt.

The surfaces of the metals may be plated with zinc or zinc alloys utilizing many of the various processes known in the art including electro zinc plating, zinc hot dipping, electro zinc alloy plating, mechanical plating, etc. Processes for electrodepositing zinc and zinc alloys on various metals have been described previously, and both alkaline and acidic plating baths have been described. For example, acidic plating baths for the electrodeposition of bright zinc deposits on substrates are described in U.S. Pat. Nos. 4,169,772, 4,162,947. U.S. Pat. No. 5,200,057 describes methods and compositions for depositing zinc and zinc alloys using acidic baths. U.S. Pat. No. 4,832,802 describes acid zinc-nickel plating baths and methods for electrodepositing zinc-nickel alloys. U.S. Pat. No. 4,188,271 describes an alkaline bath useful for electrodeposition of zinc. The disclosures of these patents are hereby incorporated by reference.

In one embodiment, the acidic zinc and zinc-alloy plating baths utilized in the method of the present invention include conventional zinc and ammonium containing plating bath as well as ammonia-free acidic plating baths. The zinc plating bath useful in the present invention contain free zinc ions, and the baths may be prepared with zinc sulfate, zinc chloride, zinc fluoroborate, zinc acetate, zinc sulfamate and/or zinc alkane sulfonic acid. The zinc ion concentration in the plating baths may range from about 5 g/l to about 180 g/l, or from about 7.5 to about 100 g/l. When the plating baths contain other metals in order to deposit a zinc-alloy, the baths will contain one or more additional metal such as nickel, iron, cobalt, and manganese in addition to the zinc. The nickel ions may be present in the aqueous plating bath in the form of aqueous-soluble salts such as nickel chloride, nickel sulfate, nickel fluoroborate, nickel acetate, nickel sulfamate, and nickel alkane sulfonic acid salts. When cobalt ions are present in the aqueous plating baths, the cobalt may be present in the form of cobalt sulfate, cobalt chloride, cobalt fluoroborate, cobalt sulfamate or cobalt acetate. Similarly, when iron is present, the iron may be introduced as iron sulfate, iron chloride, etc. When additional ions such as nickel, cobalt, iron, and/or manganese are present in the plating baths, these additional ions may be present in concentrations of from about 10 to about 150 g/l.

When alkaline zinc electrodepositing baths are utilized in the present invention, the source of zinc ions may be alkali metal zincates such as sodium zincate or potassium zincate. Other sources of zinc ions include zinc oxide, zinc sulfate, zinc acetate, etc. The plating baths also contain an alkaline material which is usually an alkali metal hydroxide such as sodium hydroxide or potassium hydroxide.

In one embodiment, when the zinc alloy deposited on the metal surface is a zinc nickel alloy, the alloy, may contain from about 8% nickel to about 20% by weight of nickel. In other embodiments, the zinc nickel alloys may contain from about 10 to about 18% by weight of nickel or from about 12 to about 16% by weight of nickel. When the alloy is a zinc-iron alloy, the alloy may contain from about 0.1 to about 5% by weight of iron. In another embodiment, the zinc ion and the nickel ion are present at concentrations sufficient to deposit a zinc-nickel alloy having a substantially gamma crystallographic phase. A zinc-nickel alloy having a substantially gamma crystallographic phase is more resistant to corrosion, particularly chloride- or salt-derived corrosion, than is an alloy having a phase other than the substantially gamma phase.

Procedures and solutions for plating zinc alloys such as zinc-nickel and zinc-iron also are commercially available. For example, an alkaline zinc-nickel plating solution and process are available from Atotech USA Inc., Rockhill, S.C. 29730 under the general trade designation REFLECTALLOY®ZNA. REFLECTALLOY®ZNA is an cyanide-free process that produces a zinc-nickel alloy deposit containing from about 10 to about 15% nickel across a wide range of current densities.

An example of a commercially available zinc-iron plating solution and process which is useful in the process of the present invention is Protedur™ Plus which is an alkaline zinc-iron plating bath and process that deposits a corrosion-resistant coating having a functional, semi-bright appearance. Protedur™ Plus is also available from Atotech USA. The Protedur™ alkaline zinc-iron plating bath and process may be utilized to deposit zinc-iron alloys containing iron in the range of from about 0.1 to about 5% by weight, and in one embodiment, for optimal corrosion protection, the iron content of the deposit is maintained within the range of from about 0.4 to about 1% by weight.

The zinc or zinc alloy plated metal surfaces which are described above are provided with a chromium (chromate) coating by contacting the zinc or zinc alloy surface with an aqueous acidic chromium solution comprising trivalent chromium as substantially the only chromium ion present. The treatment of zinc surfaces with solutions wherein the chromium is substantially entirely in the trivalent state is disclosed in, for example, U.S. Pat. Nos. 5,415,702, 4,263, 059, 4,171,231, 3,932,198, 3,647,569, 3,501,352 and 2,559, 878. Any of the aqueous acidic chromium solutions comprising a trivalent chromium as substantially the only chromium ion present which are described in the above patents may be utilized in the process of the present invention. The disclosures of the above patents are hereby incorporated by reference.

As noted, the aqueous acidic chromium solutions which are utilized in the present invention comprise trivalent chromium as substantially the only chromium ion present. In one embodiment, the chromium solution may contain incidental amounts of inadvertent hexavalent chromium, and in another embodiment the amount of hexavalent chromium in the solution should be less than the amount which would form a chromate coating containing $0.1$ $mg/m^2$. The trivalent chromium may be derived directly from a number of sources including chromium (III) sulfate, chromium (III) chloride, chromium (III) acetate, chromium (III) nitrate, etc. In one embodiment, the trivalent chromium is derived from chromium (III) chloride. In another embodiment, the trivalent chromium in the acidic solutions used in the process of the invention may be prepared by the reduction of a hexavalent chromium containing solution. Various water soluble or water dispersible sources of hexavalent chromium can be used in the preparation of the trivalent chromium provided the anions or cations introduced with the hexavalent chromium are not detrimental to the solution itself or the zinc or zinc nickel alloy surfaces.

In one embodiment, the acidic chromium solutions also comprise one or more of chloride ions, nitrate ions, zinc ions and fluoride ions.

The chloride ions which may be present in the acidic chromium solution may be introduced as chromium chloride or other chlorides such as sodium chloride, potassium chloride, ammonium chloride, zinc chloride, etc. The nitrate ion which may be present in one embodiment of the invention may be introduced through the use of nitric acid and soluble ammonium and alkali metal nitrates such as ammonium nitrate, sodium nitrate, potassium nitrate, etc. In one embodiment, the chromium solutions also comprise zinc ions. The zinc ions may be introduced into the plating baths as zinc chloride, zinc fluoride, zinc sulfate, zinc bromide, zinc acetate, zinc methane sulfonate, zinc oxide, etc. The fluoride ions which may be present in the acidic chromium solutions may be introduced through the use of any soluble fluoride compound provided that the ions introduced with the fluoride ions are not detrimental to the performance of the solution. Either metal or ammonium fluorides may be used, and typical fluoride materials include hydrofluoric acid, alkali metal fluorides and alkali metal hydrogen fluorides such as sodium fluoride, ammonium fluoride, ammonium bifluoride, etc. Since high water solubility is desired, highly soluble fluorides such as a sodium or ammonium bifluorides are utilized in one embodiment.

The aqueous chromium solutions utilized to apply a chromium coating on the zinc and zinc alloy surfaces in accordance with the method of the invention are acidic (i.e., a pH up to 6.9) and, in one embodiment, the pH of the aqueous acidic chromium solutions is from about 1 to about 3 or 4. In other embodiments, the pH of the solution which is utilized to deposit the chromium coating is maintained at from about 1 to about 2. The acidity of the chromium solution may be adjusted to and maintained at the desired pH by the addition of one or more inorganic acids such as nitric acid, sulfuric acid, hydrochloric acid, hydrofluoric acid, etc. In another embodiment organic acids such as formic acid, acetic acid and proprionic acid may be used.

In the coating operation the zinc or zinc alloy surface is, in one embodiment, first cleaned by chemical and/or physical means to remove any grease, dirt or oxides, although such treatments are not always required. After rinsing the surface with water, the surface is treated with the aqueous acidic chromium containing solutions described above. Treatment may be by any of the commonly used techniques such as spraying, brushing, dipping, roller-coating, reverse roller-coating and flow coating. The acidic chromium solutions are applied, in one embodiment, to the zinc or zinc alloy surfaces at a temperature of from about 40° to about 70° C. for a period of about 10 seconds to about 2 minutes.

In one embodiment, a useful chromate conversion coating solution may be prepared from a concentrate which comprises about 41 parts by weight of water, 37 parts by weight of intermediate chromic chloride solution ($Cr(OH)_xCl_{3-x}$) containing about 13.1 to 13.5% by weight of Cr(III), 3 parts by weight of ammonium bifluoride, 18 parts by weight of sodium nitrate and 1 part by weight of zinc chloride. This concentrate is diluted to about 8–10% by volume in water, and may be applied to zinc-nickel alloy plated metals at a pH in a range of from about 1.3 to about 1.8 and at a temperature of from about 122–144° F. (50–65° C.) for a period of about 1 to 2 minutes. For use over zinc-iron and zinc-iron-cobalt plated metal surfaces, the alloy plated metal is treated with the chromium solution at a pH of from about 1.8 to about 2.0 and at a temperature of from about 130 to about 145° F. (54–63° C.) for about 1 to 2 minutes.

Various commercially available trivalent chromium coating solutions and processes are useful in the process of this invention, and these include RODIP®ZnX Chromate Conversion Coating, EcoTri, and CorroTriblue which are available from Atotech USA, Inc.

After a chromate film has been deposited on the zinc or zinc alloy plated metal as described above, a protective film of a siccative organic coating composition is applied and deposited on the chromium coating using a cathodic electrocoating process. In the electrocoating process, the chromate coated metal article is placed in a siccative organic coating composition which contains water-emulsified colloidal paint particles. In the process of the present invention, a negative charge is placed on the chromium coated zinc or zinc alloy plated metal which becomes the cathode, and a positive charge is applied to a second electrode, generally, the container of the paint. In this electric field, the colloidal particles of the paint which are in suspension and have a positive charge are attracted to the metal surface which has a negative charge (cathode). Upon contact with the metal surface bearing the negative charge the colloidal particles loose their electrical charge thereby breaking the emulsion and the colloidal particles are deposited as a coating on the cathode (the metal parts to be coated).

As the coating forms and increases in thickness, the increasing resistive material property of the siccative organic coating becomes a factor, and at some point the cathode current density falls to a point where electrodeposition can no longer occur. If additional coating thickness is desired, the voltage gradient is increased. Thus, the electrical potential applied in the process of electrodeposition is determined by the desired thickness of the coating, the conductivity and the composition of the coating bath, and the time allotted for the formation of the coating. In one embodiment, voltages are from about 10 to about 1000 volts are useful at a current density of from about 0.1 to 7 amperes per square foot. In one embodiment, satisfactory siccative organic coatings are obtained utilizing voltages of from 25 to about 350 volts. In one embodiment, when the metal has been plated with a zinc-nickel alloy, a voltage in the range of about 120 to about 150 volts may be employed.

The coated metal pieces are then removed from the solution, rinsed, and baked in an oven to cure the deposited coating. The thickness of the cathodic electro deposited siccative organic coating may vary over a wide range. In one embodiment, the thickness is from about 5 to about 50 microns. In another embodiment, the coating thickness is from about 10 to about 25 microns.

The siccative organic coating compositions which are utilized in the cathodic electrocoating process of the present invention generally comprise water emulsions, dispersions or solutions based on water-dispersible or emulsifiable synthetic basic polymer resins which have been neutralized with a soluble acid. In one embodiment, the siccative organic coating comprises thermosetting resins which are neutralized with a soluble acid, and such thermosetting resins include epoxy resins, amino resins, mixtures of epoxy resins and amino resins, etc. The amount of the resin included in the aqueous siccative organic coating compositions used in the process of this invention may range from about 3% to about 40% by weight. In another embodiment, the amount of resin included in the aqueous siccative organic coating compositions may range from about 5 to about 25% by weight of resin.

The siccative organic coating compositions used in the present invention may also contain pigments which may be inorganic pigments or dyes. The choice of pigment will depend upon the particular color or colors desired in the coatings. The amount of pigment incorporated into the aqueous compositions of the present invention will be from about 0 to about 25% by weight or more of the total weight of the composition.

Carbon blacks are well-known color pigments often utilized in black formulations. Among the carbon blacks which may be utilized as color pigments in the present invention are furnace blacks, channel blacks and lamp blacks. The pigment powder also may be metal powders, metal oxides and other inorganic compounds. Examples of metallic powders include nickel, nickel flakes, steel flakes, bronze powder, aluminum powder, etc. Among the metallic oxides which can be utilized as pigments are zinc oxide, aluminum oxide, magnesium oxide, silicon, talc, mica, clay, iron oxide red, iron oxide yellow, chrome oxide green and titanium oxide white. Other inorganic pigments which may be utilized to provide desired colors include zinc sulfide, cadmium sulfide, cadmium sulfo-selenide, cadmium mercury, calcium carbonate, zinc molybdate, zinc chromate, cobalt aluminate, chrome cobalt-alumina, ultra marine blue and lead carbonate. Organic pigments include Para Red, Lithol Rubine, Halio Bordeaux, Thio Indigo, Toluidine, Anthraquinone, Phthalocyanine Blue, Phthalocyanine Green, Azo, etc.

In addition to water, resin and the optional pigments, the siccative organic coating composition useful in the process of the invention may also contain other components which modify the properties of the aqueous compositions and/or the coatings deposited on the metal articles. Thus, the aqueous compositions may contain one or more surfactants, lubricants, organic phosphate esters, organic solvents, surface tension modifiers, adhesion promoters, corrosion-inhibiting additives, flow and wetting modifiers, defoamers, etc.

In one embodiment, the siccative organic coating compositions used in the process of the present invention may contain from about 0.1 to about 15% by weight based on the weight of the resin, of a hydrophobic fluoroalkene polymer. The fluoroalkene polymers include polymers and copolymers of vinyl fluoride, vinylidene fluoride and tetrafluoroethylene with other polymerizable monomers. The polymers and copolymers may be prepared by suspension polymerization or by bulk polymerization. An example of a commercially available polyvinylidene fluoride useful in the siccative organic coating compositions is Kynar 202 available from Pennwalt Corp. An example of a polyvinyl fluoride is Tedlar® available from E. I. DuPont, De Nemours and Co. In one embodiment, the fluoroalkene polymer is polytetrafluoroethylene (PTFE). Polytetrafluoroethylene is available commercially from DuPont under the general trade designation Teflon®. Copolymers of tetrafluoroethylene also are useful, and these include polymers of $C_2F_4$ modified with small amounts of mostly fluorinated comonomers, and $C_2F_4$ polymers with fluoroolefins, etc.

Another lubricant that which may be included in the siccative organic coating compositions is an aqueous dispersion of the zinc salt of an ethylene-acrylic copolymer available from Michelman, Inc., Cincinnati, Ohio under the general trade designation ACqua™220.

Aqueous siccative organic coating compositions useful in the cathodic electrodeposition used in the present invention are available commercially from several sources. For example, PolySeal III and Powercron 645 Black are available from PPG. Both of these coatings are believed to comprise epoxy resins. Useful siccative organic coating compositions also are available from Atotech USA, Inc.

In one embodiment, after the siccative organic coating deposited on the metal has been cured, a lubricant film may be applied over the cured siccative organic coating. In one embodiment, the lubricants which are applied over the siccative organic coating compositions are torque tension modifiers. Examples of lubricant compositions which may be applied over the siccative organic coating compositions include polyethylene wax, polytetrafluoroethylene, hydrocarbon or vegetable oils, chlorinated parafin, phosphate esters, sulfurized oils, sulfurized fats, polyglycols, carboxylic acid esters, polyalphaolefins, etc. Mixtures of two or more of any of the above lubricants may be utilized. Depending on the particular lubricant used, the lubricant may be applied to the siccative organic coating, neat, in solution, or dispersed in a non-solvent such as water. The lubricant may be applied utilizing techniques well known in the art such as by spraying, dipping, roller coating, brushing, reverse roller-coating, flow coating, etc. After application of the lubricating composition, the lubricant coating is dried to remove any solvent and/or water.

The metal articles which have been treated in accordance with the process of the present invention exhibit improved corrosion and rust resistance as demonstrated by subjecting treated metal pieces to various tests such as a salt spray corrosion test according to ASTM procedure B117, a cyclic corrosion test (CCT) according to test procedure VDA 621-415, outdoor weathering tests in accordance with VDA 621-414 and an NSS Test with scribed line according to Din 50021.

While the invention has been explained in relation to its various embodiments, it is to be understood that other modifications thereof will become apparent to those skilled in the art upon reading the specification. Therefore, it is to be understood that the invention disclosed herein is intended to cover such modifications as fall within the scope of the appended claims.

The invention claimed is:

1. A process for improving the corrosion resistance of a metal comprising:
   (A) plating the metal with a zinc alloy to form a zinc alloy surface having a substantial gamma crystallographic phase,
   (B) applying a chromium coating on the zinc alloy surface by contacting the zinc alloy surface with an aqueous acidic chromium solution comprising trivalent chromium as substantially the only chromium ion present, and
   (C) depositing a siccative organic coating on the chromium coating using a cathodic electrocoating process.

2. The process of claim 1 wherein the zinc alloy is a zinc-nickel alloy.

3. The process of claim 1 wherein the aqueous acidic chromium solution also comprises zinc ions.

4. A process for improving the corrosion resistance of a metal comprising:
   (A) plating the metal with a zinc or zinc alloy to form a zinc or zinc alloy surface,
   (B) applying a chromium coating on the zinc or zinc alloy surface by contacting the zinc or zinc alloy surface with an aqueous acidic chromium solution comprising trivalent chromium as substantially the only chromium ion present,
   (C) depositing a siccative organic coating on the chromium coating using a cathodic electrocoating process,
   (D) curing the siccative organic coating, and
   (E) applying a lubricant film over the cured siccative organic coating.

5. A process for improving the corrosion resistance of a metal comprising:
   (A) plating the metal with a zinc alloy containing zinc and one or mare of iron, nickel, cobalt and manganese to form a zinc alloy surface having a substantial gamma crystallographic phase,
   (B) applying a chromium coating on the zinc alloy surface by contacting the zinc alloy surface with an aqueous acidic chromium solution comprising trivalent chromium as substantially the only chromium ion present, chloride ions and nitrate ions, and
   (C) depositing a siccative organic coating composition on the chromium coating using a cathodic electrocoating process.

6. The process of claim 5 wherein the zinc alloy is a zinc-nickel alloy.

7. A process for improving the corrosion resistance of a metal comprising:
   (A) plating the metal with a zinc alloy containing zinc and one or more of iron, nickel, cobalt and manganese to form a zinc alloy surface,
   (B) applying a chromium coating on the zinc alloy surface by contacting the zinc alloy surface with an aqueous acidic chromium solution comprising trivalent chromium as substantially the only chromium ion present, chloride ions and nitrate ions,
   (C) depositing a siccative organic coating composition on the chromium coating using a cathodic electrocoating process,
   (D) curing the siccative organic coating, and
   (E) applying a lubricant film over the cured siccative organic coating.

8. A process for improving the corrosion resistance of a metal comprising:
   (A) plating the metal with zinc-iron alloy to form a zinc-iron alloy surface,
   (B) applying a chromium coating on the zinc-iron alloy surface by contacting the zinc-iron alloy surface with an aqueous acidic chromium solution comprising trivalent chromium as substantially the only chromium ion present, and (C) depositing a siccative organic coating on the chromium coating using a cathodic electrocoating process.

9. A process for improving the corrosion resistance of a metal comprising:
  (A) plating the metal with a zinc alloy containing zinc and iron to form a zinc-iron alloy surface,
  (B) applying a chromium coating on the zinc-iron alloy surface by contacting the zinc-iron alloy surface with an aqueous acidic chromium solution comprising trivalent chromium as substantially the only chromium ion present, chloride ions and nitrate ions, and
  (C) depositing a siccative organic coating composition on the chromium coating using a cathodic electrocoating process.

10. The process of claim 9 wherein the metal comprises steel.

11. The process of claim 9 wherein the aqueous acidic chromium solution also comprises zinc ions and fluoride ions.

\* \* \* \* \*